(No Model.) 2 Sheets—Sheet 1.

C. S. CAFFREY.
SULKY.

No. 506,414. Patented Oct. 10, 1893.

WITNESSES:

INVENTOR:
Charles S. Caffrey (No Model.) 2 Sheets—Sheet 2.
C. S. CAFFREY.
SULKY.
No. 506,414. Patented Oct. 10, 1893.
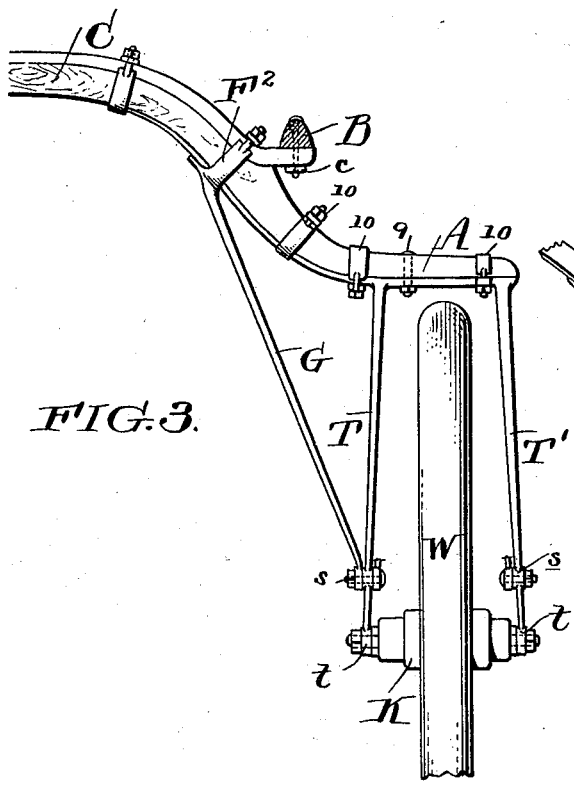
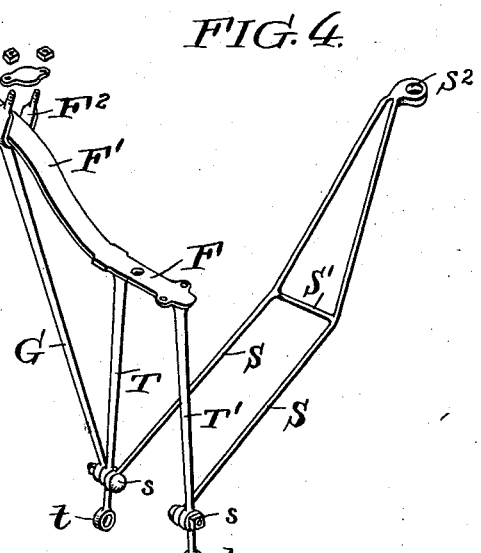
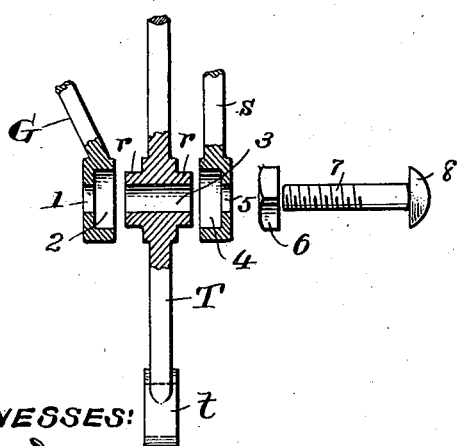
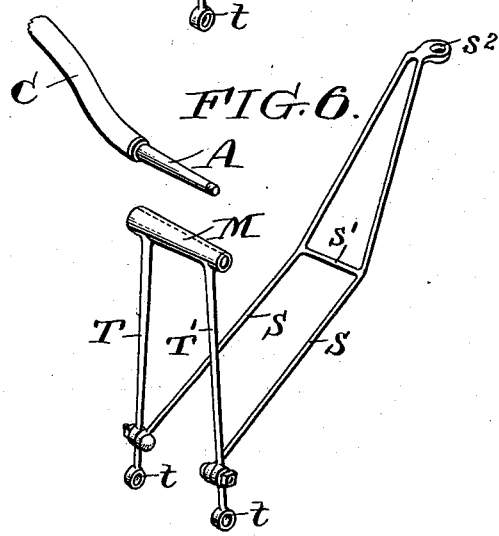
WITNESSES:
INVENTOR:
Charles S. Caffrey
by his Atty

UNITED STATES PATENT OFFICE.

CHARLES S. CAFFREY, OF CAMDEN, NEW JERSEY.

SULKY.

SPECIFICATION forming part of Letters Patent No. 506,414, dated October 10, 1893.

Application filed April 10, 1893. Serial No. 469,681. (No model.)

*To all whom it may concern:*

Be it known that I, CHARLES S. CAFFREY, a citizen of the United States, and a resident of the city of Camden, in the State of New Jersey, have invented certain new and useful Improvements in Sulkies, of which the following is a full, clear, and exact description, reference being had to the accompanying drawings, forming a part of this specification.

My invention relates to trotting sulkies, and has for its object to provide a brace and axle-bearing for a narrow diameter wheel, such as a pneumatic tire wheel, adapted more especially to a sulky constructed with a centrally elevated axle and axle brace, such as is described in the Letters Patent No. 444,921, granted to H. B. Paul, dated January 20, 1891. And to this end my invention consists primarily in a brace bar adapted to fit on or under the axle or axle brace with two downwardly projecting arms journaled at the ends to receive and support the wheel hub, in combination with a forked or two armed shaft brace, the head or end of which is bolted to the shaft, and the forked ends respectively bolted to the respective journaled arms of the wheel brace. Also in the combination therewith of a stay brace between the inner one of said journaled arms of the wheel brace, and the main axle brace. Also in a particular combination of said journaled arm wheel brace with the forked shaft brace by bolting the latter to the former at a point slightly above the journal recesses therein, and by counter-sunk heads formed on the ends of said forked brace.

Figure 1:
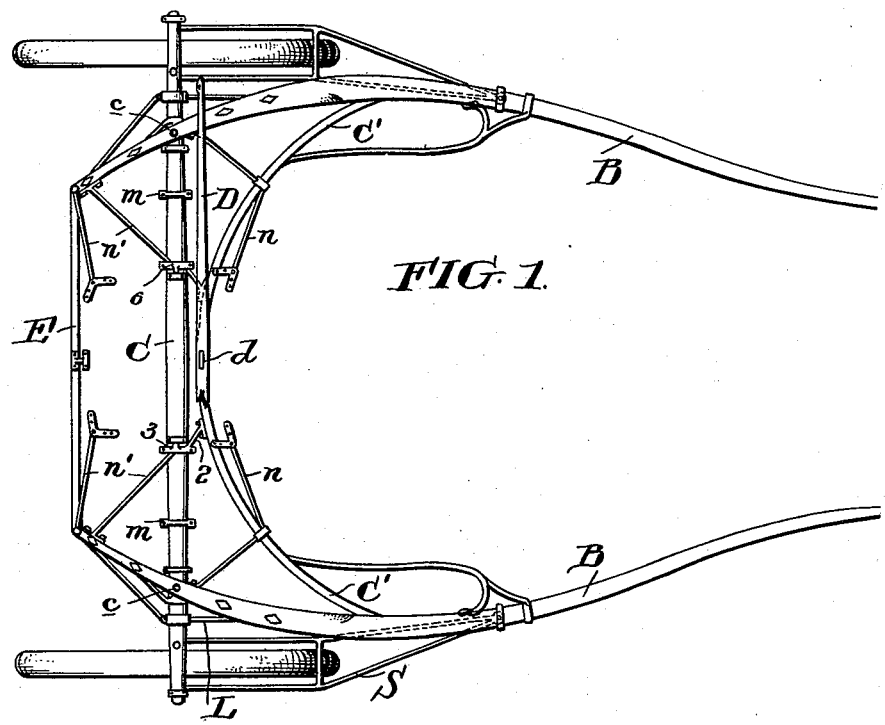
Figure 2:
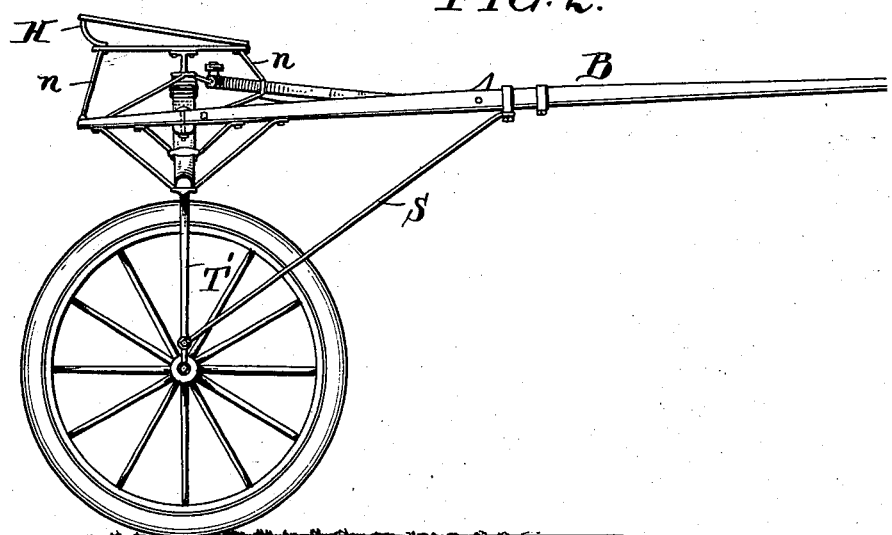

In the accompanying drawings illustrating my invention, in which similar letters and figures of reference indicate like parts in the several views: Figure 1 is a plan view of a sulky, with the seat removed, and to which the wheel braces of my invention are applied. Fig. 2 is a side view thereof. Fig. 3 is an enlarged detached end view of my improvement, shown in place on the main axle brace of a sulky. Fig. 4 is an elevation of the same, detached from the main axle brace. Fig. 5 is a section showing the counter-sunk ends of the forked shaft brace and the mode of connecting the same with the journaled arms of the wheel brace. Fig. 6 is a modification of the brace bar of the wheel brace, to adapt my invention to a sulky provided with an axle for a high wheel, the said brace bar being journaled and slipped over the end of the axle, instead of being clipped to the under side of the axle and axle brace as in Figs. 3 and 4.

In the drawings the sulky is shown constructed in its main features as described in the aforesaid Letters Patent No. 444,921, that is to say, the shafts B B are connected together at the rear by the back cross-bar E and at the front by the front cross bar C' of the usual curved form. The singletree D is pivoted on the top of the central portion of this front cross-bar as usual, at *d*. The axle brace C is shown elevated to a point slightly above the plane of the shafts, curving downward at each end, where it is firmly secured to the shafts at *c*. The axle brace C is preferably of wood and is glued to the usual frame work in which the body of the axle is supported. The axle A, with its central supporting frame-work, is shown curved upward by sharp curves, so as to bring the whole portion of it that lies between the shafts in close contact with the lower side of the axle-brace C, the two being additionally held together by clips *m m*.

As shown in the drawings, stay pins 1 and 2 connect the rear portion of the shafts with the front curved cross bar and intermediately with the axle brace, and also serve to support the seat H, which is mounted as usual, upon four seat stays *n n*, extending from each of its four corners, two to the front cross bar C' and two to the rear bar E. It is obvious however, that this mode of securing the brace and axle, are not essential to the use of my invention, which is applicable to any form of centrally elevated axle. Formerly, and as shown in said patent No. 444,921, the wheel used was large in diameter and its hub was fitted directly upon the end of the axle A so that its rim was equal in height almost, to the base of the seat. My present invention has for its object, to adapt a small diameter wheel, such as a pneumatic tire wheel, to such a sulky constructed with a centrally elevated axle, and particularly to the form of such a sulky constructed as shown in said patent. Hence my invention is shown in Figs. 3, 4, 5 and 6; where, in Fig. 4, is seen a brace bar F with an upwardly curved extended end F' adapted to the curvature of the axle A. Said brace bar F has two downwardly extending arms T T', terminating in journaled ends $t\ t$ in which the hub K of the wheel W finds its bearings. Where the axle A has been originally constructed to receive a large diameter wheel, I omit the extension end F' of the brace bar F and construct the brace bar F in the form shown at M in Fig. 6, that is, by making it round and boring it out so that it can be slipped on and over the end of the axle A. The said brace bar F F' and its arms T T' are secured to the axle A by bolts and clips 9 and 10 and by a stay iron G which is bolted at one end to the arm T of the wheel brace and at the other end terminates in a clip $F^2$ embracing the axle brace C and axle A. The said wheel arms T T' are further maintained in position relatively to the shafts B by means of a forked brace S S, of appropriate linear form, with the fork arms preferably united midway by a connection S', and the head or end $S^2$ provided with an eye whereby it may be bolted to the shaft. The forked ends S S are secured to the wheel brace T T slightly above the journaled ends thereof, at $s, s$ and to prevent them jolting loose laterally they are connected in a particular manner, viz: (see Fig. 5) the arms T T' are each provided with a collar $r$, and recessed at 3 to admit the bolt 7, while the inner face of the end of the arms G and S and counter-sunk at 4 to slip over the collar $r$ and recessed at 5 to admit the bolt 7 which is passed through the several recesses up to its head 8 and fastened on the other side by the nut 6, so that by this means all lateral movement of the parts is absolutely prevented.

Having thus described my invention, what I claim as new, and desire to secure by Letters Patent, is—

1. The combination in a sulky provided with a centrally elevated axle, of a device to support and brace the wheel hub from the axle, axle brace, and shafts, respectively, consisting of the following parts: a brace bar F F' conforming to the curvature of the axle and secured thereto, downwardly projecting forked arms T T' constructed integral with the brace F and having journal bearings at their ends to receive the hub of the wheel, a forked brace S S between the shaft and the arms T T' and a brace bar G between the arm T and the axle and axle brace; substantially as described.

2. The combination in a sulky with the wheel brace having forked arms T T', journaled at their ends, of a shaft brace S S secured to said forked arms at a point slightly above their journaled ends, said arms T T' being recessed at said point of connection and provided thereat with a collar $r$, and said arms S S having countersunk and recessed ends 4, 5; said parts being adapted to coincide and be secured by a single bolt and nut 6, 7, 8, substantially as described.

3. The combination in a sulky with a wheel brace having forked arms T T' journaled at their ends of a shaft brace S S and an axle brace G both secured to said forked arms at a point slightly above their journaled ends, said arms T T' being recessed at said point of connection and provided thereat with a collar $r$, said brace arms S S having countersunk and recessed ends 4, 5, and said shaft-brace G having a countersunk and recessed end 1, 2; said parts being adapted to coincide and be secured by a single bolt and nut 6, 7, 8; substantially as described.

In testimony whereof I have hereunto affixed my signature this 15th day of March, A. D. 1893.

CHARLES S. CAFFREY.

Witnesses:
H. J. STILES,
A. W. MARSHALL.